(12) United States Patent
Besser et al.

(10) Patent No.: US 10,189,933 B2
(45) Date of Patent: Jan. 29, 2019

(54) METHOD FOR PRODUCING FUNCTIONALIZED THERMOPLASTIC ELASTOMERS

(71) Applicant: BYK KOMETRA GmbH, Schkopau (DE)

(72) Inventors: Klaus Dieter Besser, Petersberg OT Gutenberg (DE); Jochen Gerecke, Halle (DE); Bianka Leitner, Schkopau (DE); Inno Rapthel, Halle (DE)

(73) Assignee: BYK-CHEMIE GMBH, Wesel (DE)

( * ) Notice: Subject to any disclaimer, the term of this patent is extended or adjusted under 35 U.S.C. 154(b) by 0 days.

(21) Appl. No.: 14/772,023

(22) PCT Filed: Mar. 14, 2014

(86) PCT No.: PCT/EP2014/000704
§ 371 (c)(1),
(2) Date: Sep. 1, 2015

(87) PCT Pub. No.: WO2014/146773
PCT Pub. Date: Sep. 25, 2014

(65) Prior Publication Data
US 2016/0017081 A1  Jan. 21, 2016

(30) Foreign Application Priority Data
Mar. 20, 2013  (EP) .................................... 13001423

(51) Int. Cl.
| | | |
|---|---|---|
| *C08F 287/00* | (2006.01) | |
| *C08F 2/36* | (2006.01) | |
| *C08F 4/38* | (2006.01) | |
| *C08F 255/02* | (2006.01) | |
| *C08F 285/00* | (2006.01) | |
| *C09J 151/00* | (2006.01) | |
| *C08K 5/134* | (2006.01) | |
| *C08K 5/52* | (2006.01) | |

(52) U.S. Cl.
CPC .............. *C08F 287/00* (2013.01); *C08F 2/36* (2013.01); *C08F 4/38* (2013.01); *C08F 255/02* (2013.01); *C08F 285/00* (2013.01); *C08K 5/134* (2013.01); *C08K 5/52* (2013.01); *C09J 151/003* (2013.01)

(58) Field of Classification Search
None
See application file for complete search history.

(56) References Cited

U.S. PATENT DOCUMENTS

| 4,174,358 A | 11/1979 | Epstein |
|---|---|---|
| 4,528,329 A | 7/1985 | Inoue et al. |
| 4,537,929 A | 8/1985 | Nangrani |
| 4,684,576 A | 8/1987 | Tabor et al. |
| 4,751,270 A | 6/1988 | Urawa et al. |
| 4,927,888 A | 5/1990 | Strait et al. |
| 5,346,963 A | 9/1994 | Hughes et al. |
| 6,331,592 B1 | 12/2001 | Wong |
| 6,384,139 B1 | 5/2002 | Ho et al. |
| 6,884,850 B2 | 4/2005 | Schauder et al. |
| 2005/0176888 A1 | 8/2005 | Schauder et al. |
| 2006/0199914 A1 | 9/2006 | Harris et al. |
| 2006/0199930 A1 | 9/2006 | Li Pi Shan et al. |
| 2006/0211825 A1* | 9/2006 | Schauder .............. C08F 279/02 525/285 |
| 2011/0077356 A1* | 3/2011 | Besser ...................... C08F 2/36 525/78 |

FOREIGN PATENT DOCUMENTS

| DE | 275160 A3 | 1/1990 |
|---|---|---|
| DE | 275161 A3 | 1/1990 |
| DE | 300977 A7 | 9/1992 |
| DE | 4123972 A1 | 1/1993 |
| DE | 4342605 A1 | 6/1995 |
| DE | 19607430 C1 | 4/1997 |
| DE | 19841303 A1 | 3/2000 |
| DE | 19914146 A1 | 10/2000 |
| DE | 102007030801 A1 | 1/2009 |
| EP | 0085115 | 8/1983 |
| EP | 0173380 | 3/1986 |

(Continued)

OTHER PUBLICATIONS

Machine Translation of Gerecke WO 2004/048426 A3, p. 1-13.*
International Search Report, PCT/EP2014/00704, dated May 26, 2014.

*Primary Examiner* — Robert T Butcher
(74) *Attorney, Agent, or Firm* — Cohen & Hildebrand, PLLC

(57) ABSTRACT

A method for producing functionalized thermoplastic elastomers on the basis of grafting substrates, selected from olefine-block copolymers of composition 80 to 98 mass-% ethylene-/2 to 20 mass-% $C_3$- to $C_{12}$-olefine units or partially crystalline propylene/ethylene and/or $C_4$- to $C_{12}$-olefine and/or $C_4$- to $C_{12}$-diene-copolymers of composition 50 to 98 mass-% propylene-/2 to 50 mass-% $C_2$- and/or $C_4$- to $C_{12}$-olefine and/or $C_4$- to $C_{12}$-diene units or cross-linked styrene/olefine/styrene or styrene/olefine-block copolymers, wherein, in a liquid mixing reactor per 100 mass parts of particular grafting substrate—0.1 to 15 mass parts of at least one functional monomer from the series of functional groups comprising α,β-ethylenic unsaturated compounds or 0.1 to 15 mass parts of a monomer mixture comprising at least one of said functional monomers and—0.01 to 10 mass parts of at least one initiator forming free radicals having a 1-hour half-life temperature ($T_{Hwz/1h}$) between 50 and 200° C. are added and, at reaction temperatures between 40° C. and the melting or softening temperature of the grafting substrate, are polymerized over a reaction period between 10 and 200 min to solid-fluid phase, wherein a grafting product having a grafted functional monomer is produced by such a solid phase functionalization which is used as an input component for further processing. Functionalized thermoplastic elastomers having a degree of functionalization between 0.1 and 5 mass-% can be obtained using the method. Said elastomers are suitable for use as a bonding agent and/or adhesive agent for various substrates or multi-layer composites.

13 Claims, No Drawings

(56) References Cited

FOREIGN PATENT DOCUMENTS

| | | |
|---|---|---|
| EP | 0266221 | 5/1988 |
| EP | 0287140 | 10/1988 |
| EP | 0370753 | 5/1990 |
| EP | 0371001 | 5/1990 |
| EP | 0403109 | 12/1990 |
| EP | 0467178 | 1/1992 |
| EP | 0469693 | 2/1992 |
| EP | 0581360 | 2/1992 |
| EP | 0501762 | 9/1992 |
| EP | 0642538 | 3/1995 |
| EP | 0659784 | 6/1995 |
| EP | 0696303 | 2/1996 |
| EP | 0754731 | 1/1997 |
| EP | 0805827 | 11/1997 |
| EP | 0878510 | 11/1998 |
| WO | 9118053 A1 | 11/1991 |
| WO | 9842760 A1 | 10/1998 |
| WO | 0192357 A1 | 12/2001 |
| WO | 2004048426 A2 | 6/2004 |
| WO | 2006102016 A2 | 9/2006 |
| WO | 2008079784 A2 | 7/2008 |
| WO | 2008080111 A1 | 7/2008 |
| WO | 2009033465 A2 | 3/2009 |

\* cited by examiner

METHOD FOR PRODUCING FUNCTIONALIZED THERMOPLASTIC ELASTOMERS

This is an application filed under 35 USC § 371 of PCT/EP2014/000704 filed on Mar. 14, 2014, claiming priority to EP 13001423.6 filed on Mar. 20, 2013.

BACKGROUND OF THE INVENTION

The invention relates to a process for preparing functionalized thermoplastic elastomers based on graft substrates selected from
- olefin block copolymers having the composition from 80 to 98 mass-% of ethylene-12 to 20 mass-% of $C_3$- to $C_{12}$ olefin units, or
- semi-crystalline propylene/ethylene and/or $C_4$- to $C_{12}$ olefin copolymers and/or $C_4$- to $C_{12}$ diene copolymers of the composition 50 to 98 mass-% of propylene-/2 to 50 mass-% of $C_2$- and/or $C_4$- to $C_{12}$-olefin units and/or $C_4$- to $C_{12}$-diene units, or
- cross-linked styrene/olefin/styrene- or styrene/olefin-block copolymers.

For numerous applications, particularly as compatibility or adhesion promoter (adhesive agent), statistical (random) and heterophasic (impact) propylene copolymers (RCP, HCP), ethylene/propylene copolymers (EPM) or ethylene/propylene/diene terpolymers (EPDM) containing carboxylated olefin polymers based on polyethylenes of different density (LDPE, MDPE, HDPE), ethylene/$\alpha,\beta$-ethylenically unsaturated $C_3$- to $C_{12}$ olefin copolymers (LLDPE, POE) or propylene-homo (HPP) and $C_2$- and/or $C_4$- to $C_{12}$ olefin units are used. The aforementioned polymers are generally produced by means of reactive extrusion at high temperatures (150 to 300° C.) by grafting on the olefin backbone polymer an $\alpha,\beta$-ethylenically unsaturated mono- or dicarboxylic acid or the anhydride thereof, particularly methacrylic acid, fumaric acid, and preferably maleic anhydride (MA), in the presence of a free-radical-forming peroxidic initiator.

The above-described prior art can be found, inter alia, in the WO 91/18053 A1, U.S. Pat. No. 4,174,358 A, U.S. Pat. No. 4,537,929 A, U.S. Pat. No. 4,684,576 A, U.S. Pat. No. 4,751,270 A, U.S. Pat. No. 4,927,888 A, EP 0 266 221 B1, EP 0 287 140 B1, EP 0 403 109 A2, EP 0 467 178 B1, EP 0 581 360 B1, EP 0 696 303 B1, EP 0 878 510 B1, U.S. Pat. No. 6,884,850 B2, US 2006/0211825 A1 and WO 2008/079784 A2.

In the same way, the corresponding functionalized olefin polymers are obtained by grafting $\alpha,\beta$-ethylenically unsaturated compounds containing hydroxyl, epoxy, amino, imido, silane groups and other functional groups.

Increasingly, highly effective, non-cross-linked olefin elastomers composed of predominantly ethylene and/or propylene units produced by using special metallocene catalyst systems or random copolymers containing predominantly isotactic propylene sequences and about 8 to 32 mole % ethylene units are used as backbone polymers for functionalizing monomers having functional groups by grafting (functional monomers). The non-cross-linked olefin elastomers include especially ethylene-$\alpha$-olefin block copolymers, such as the Infuse™ types from Dow Chemical Company. Examples for the random copolymers containing about 8 to 32 mole % ethylene units are the Vistamaxx™ types described in the documents U.S. Pat. No. 6,884,850 B2, US 2005/0176888 A1, US 2006/0199930 A1 and US 2006/0211825 A1 from ExxonMobil Chemical Company or the Versify® types from Dow as well as Notio™ types. The aforementioned types of ethylene-$\alpha$-olefin block copolymers and random copolymers from the Dow Chemical Company are described in the documents US 2006/0199914 A1, WO 2006/102016 A2 and WO 2008/080111 A1. The employed functional groups include, among others, carboxyl- or anhydride-, as well as hydroxyl- or epoxy-, amino-, imido- or silane-groups. The employed monomers with functional groups particularly frequently include $\alpha,\beta$-ethylenically unsaturated mono- or dicarboxylic acids or their anhydrides (carboxyl monomers), for example, maleic anhydride.

Graft-carboxylation or graft-maleation performed at low reaction temperatures, i.e. below the melting or softening point of the olefin backbone polymer (graft substrate) in a solvent is, due to the technologically very complex polymer dissolution and in particular due to the solvent separation and solvent recovery necessary and the required graft product purification after grafting, not an economic alternative to the melt-grafting of acid (anhydride)- or other functional monomers on graft substrates composed of predominantly olefin units. Conversely, the functionalization of olefin polymers carried out in a solid-fluid polymer phase, particularly a carboxylation or maleation, are based on an economic technology study carried out below the melting or softening temperature of the graft substrate. This is known from the documents DD 275 160 A3, DD 275 161 A3, DD 300 977 A7, DE 41 23 972 A1, DE 43 42 605 A1, EP 0 469 693 B1 and EP 0 370 753 B1.

Suitable backbone polymers for this graft-functionalization (solid state grafting) carried out in the solid phase are semi-crystalline olefin polymers, which allow high diffusion rates of low molecular weight compounds in the amorphous phase formed between its glass-transition and melting point, with unsaturated carboxylic acids or anhydrides being among the low molecular weight compounds. High diffusion rates for low molecular weight compounds are one of the prerequisites for high graft-polymerization velocities.

Amorphous and low-crystalline olefin elastomers with special morphology, in particular elastomeric olefin segments containing styrene/selectively hydrogenated diene/(styrene) multi-block copolymers, can also be used as the polymer backbone for the free-radical solid-phase graft modification under certain polymerization conditions, see documents EP 0 642 538 B1, EP 0 805 827 B1 and WO 2004/048426 A2, without achieving the required properties for use as a highly effective adhesives, including adhesion promoters for demanding metal/plastic and other multi-layer composites.

Frequently used adhesion promoters include, besides carboxylated or maleated high-density polyethylenes with the abbreviation HDPE, or carboxylated branched low-density polyethylenes, with the abbreviation LDPE, especially low-density carboxylated linear ethylene copolymers, furthermore random propylene/ethylene copolymers composed predominantly of propylene units and lastly also styrene/selectively hydrogenated diene segment/styrene or styrene/selectively hydrogenated diene segment block copolymers, with the abbreviation TPE-S, containing "elastomeric" olefin units, which are the purpose of their carbonation, especially maleation, produced mostly by melt grafting, as described, for example, in the publications U.S. Pat. No. 5,346,963 A, U.S. Pat. No. 6,384,139 B1, U.S. Pat. No. 6,331,592 B1, U.S. Pat. No. 6,884,850 B2, DE 198 41 303 A1, WO 01/92357 A1, WO 98/42760 A1, EP 0 659 784 B1, U.S. Pat. No. 4,578,829 A, EP 0 173 380 A1, EP 0 085 115 B1, EP 0 371 001 B1 and EP 0 642 538 B1, and which can be used as adhesives for various applications, as disclosed in the documents EP 0 696 303 B1, EP 0 754 731 B1 and EP 0 878 510 B1. The carboxylated linear ethylene copolymers either have a low $C_3$- to $C_{12}$-olefin co-monomer fraction below 15 mass-%, i.e. LLDPE, or a higher $C_3$- to $C_{12}$-olefin co-monomer fraction above 15 mass-%, referred to by the acronym POE. Carboxylated linear ethylene copolymers include, for example, special ethylene/octene ($C_8$) copolymers, referred to by the acronym EOC.

Moreover, bonding resins using mixtures of crystalline polyolefin, for example HDPE or LLDPE, and an amorphous or poorly crystalline olefin polymer, for example ethylene/propylene rubber with the abbreviation EPM, that were graft-carboxylated in the melt, are known and described in the publication EP 0 501 762 B1.

The known melt-grafted olefin thermoplastic elastomers disadvantageously have low levels of bonded functional groups. A low grafted functional monomer fraction is thus present, i.e. a low degree of functionalization. Another drawback is the technical/technological and expensive measures for the removal of the high residual monomer fractions from the melt.

A process for preparing functionalized polypropylenes with polypropylene by radical grafting with low molecular weight compounds having functional groups under solid phase reaction conditions is known from DE 199 14 146 A1. In this process, the grafting of compounds having functional groups on polypropylene is carried out by continuously feeding the reactants and by continuously removing the reaction product in the temperature range between 80 and 160° C. The method is used, among other things, to improve the adhesion of polypropylene to mineral reinforcing materials.

DE 10 2007 030 801 A1 describes thermoplastically processable carboxylated styrene-olefin block copolymer/polyolefin compositions with a melt volume rate of MVR (230° C./5 kg) between 1 to 300 cm³/10 min and a fraction of grafted α,β-olefinally unsaturated mono- and/or dicarboxylic acid and/or of its anhydride in proportion to the entire polymer mass of between 0.3 and 5 mass-%. The melt-processable carboxylated styrene-olefin block copolymer/polyolefin compositions can be used as an adhesion promoter in coatings on different surfaces, in laminates and composites.

DE 196 07 430 C1 discloses a continuous process for the modification of polyolefins in the solid phase. The modified polyolefins, for example styrene-modified polypropylene, can be prepared by a continuous process in which unsaturated monomers and thermally decomposing radical formers are absorbed from the gas phase by using polyolefin particles, and wherein the polyolefin particles in which the thermally decomposing free-radical generators and unsaturated monomers are absorbed, are exposed to a high-frequency field having a frequency of 2.4 to 2.5 GHz. The modified polyolefins are suitable for producing films, sheets, coatings, pipes, hollow bodies, foams and molded materials.

A method producing carboxylated ethylene polymer blends is known from WO 2009/033465 A2. In a first stage 0.05 to 15 mass parts of an α,β-ethylenically unsaturated mono- and/or dicarboxylic acid or its anhydride, or a monomer mixture containing at least one monomer and 0.01 to 10 mass parts of a radical initiator mixture are added to 100 mass parts of an ethylene polymer selected from ethylene-homo and/or linear ethylene copolymers, and graft-polymerized at reaction temperatures between 30 and 120° C. for a reaction time between 5 and 120 min. In a second stage, a mixture of 100 mass parts of the modified ethylene polymer obtained in the first solid phase stage, 150-4000 mass parts of an ethylene polymer- or polymer blend, and 150-4000 mass parts of an olefin elastomer are continuously fed to a reaction extruder, reacted at temperatures of between 160° and 260° C., wherein the graft-modified ethylene polymer blend having a degree of carboxylation between 0.05 and 1 mass-% is then continuously discharged. These products obtained on the basis of ethylene-homo and/or linear ethylene copolymers products are intended, inter alia, for use as adhesion promoters.

BRIEF SUMMARY OF THE INVENTION

It is the object of the present invention to provide, while avoiding the disadvantages described above, an adhesion promoter based on the functionalization of chemically resistant ethylene/α,β-ethylenically unsaturated $C_3$- to $C_{12}$-olefin (diene) elastomers or propylene/$C_2$- and/or α,β-ethylenically unsaturated $C_4$- to $C_{12}$-olefin (diene) elastomers as well as cross-linked styrene/olefin/styrene or styrene/olefin block copolymers (TPES-V), in particular cross-linked styrene-ethylene/butane-styrene or styrene-ethylene/(ethylene)/propylene-styrene block copolymers.

The object is achieved according to the invention by a method as claimed in claim 1. The subject matter of the present invention is thus a process for preparing functionalized thermoplastic elastomers based on graft substrates. The graft substrates are selected from olefin block copolymers of the composition of 80 to 98 mass-% ethylene-/12 to 20 mass-% of $C_3$- to $C_{12}$-olefin units, or semi-crystalline propylene/ethylene- and/or $C_4$- to $C_{12}$-olefin and/or $C_4$- to $C_{12}$-diene copolymers of the composition 50 to 98 mass-% propylene-/2 to 50 mass-% $C_2$- and/or $C_4$- to $C_{12}$-olefin and/or $C_4$- to $C_{12}$-diene units, or cross-linked styrene/olefin/styrene or styreneolefin block copolymers, in particular styrene-ethylene/butene-styrene or styrene-ethylene/(ethylene)/propylene-styrene block copolymers.

DETAILS OF THE INVENTION

According to the invention,
from 0.1 to 15 mass parts of α,β-ethylenically unsaturated compounds containing at least one functional monomer from the series of functional groups or from 0.1 to 15 mass parts (MT) of a monomer mixture containing at least one of these functional monomers, and from 0.01 to 10 mass parts of at least one initiator forming free radicals with a 1-hour half-life temperature ($T_{HWZ/1h}$) between 50 and 200° C.

are added in the process to 100 mass parts of particulate graft substrate in a fluid mixing reactor, i.e. in a temperature-controlled mixer for fine-grained materials, which ensures a free flowing powder bed, and polymerized at reaction temperatures between 40° C. and the melting or softening temperature of the graft substrate for a reaction time between 10 and 200 min in a solid-fluid phase, wherein a graft product having a grafted functional monomer is produced by such a solid phase functionalization, which is used as starting component for further processing.

In further processing of the graft product, which advantageously contains a proportion between 0.05 and 12 mass-% of grafted functional monomer, 100 mass parts of the solid phase graft product, to which between 0.1 and 60 mass parts of at least one functional monomer or a monomer mixture containing between 0.1 and 60 mass parts of at least one functional monomer and between 0.01 and 20 mass parts containing at least one initiator forming free radicals with a 1-hour half-life temperature $T_{HWZ/1h}$ between 80 and 240° C. are mixed in, together with 100 to 4000 mass parts of an unmodified olefin elastomer, are fed continuously by way of metering devices into the intake area of an extruder. The reactive extrusion is performed at temperatures above the melting or softening point of the olefin elastomer. A functionalized elastomer advantageously having a degree of functionalization between 0.1 and 5 mass-% is continuously discharged at the end of the reactor.

As a specific embodiment of the invention, a process variant has been found advantageous wherein the solid phase functionalization of 100 mass parts of particulate graft substrate with between 0.5 and 15 mass parts of at least one functional monomer or with between 0.5 to 15 mass parts of a monomer mixture containing at least one functional monomer and 0.05 to 10 mass parts of at least one initiator forming free radicals with a 1 hour half-life temperature $T_{HWZ/1h}$ at between 50 and 200° C. takes place at reaction temperatures between 50° C. and the melting or softening temperature of the graft substrate for a reaction time between 10 and 100 min, and wherein thereafter a graft product containing a proportion of between 0.1 and 10 mass-% grafted functional monomer is used as starting component. Here, 100 mass parts solid-phase graft product, to which between 0.5 and 50 mass parts of at least one functional monomer or between 0.5 and 50 mass parts of at least one monomer mixture containing a functional monomer and between 0.02 to 15 mass parts of at least one initiator forming free radicals with a 1-hour half-life temperature $T_{HWZ/1h}$ between 80 and 240° C. are admixed, are continuously fed together with 200 to 2000 mass parts of an unmodified olefin elastomer, preferably of the graft substrate used for solid phase functionalization, via metering devices into the intake section of a reaction extruder. The reactive extrusion is performed at temperatures between 160 and 300° C. An elastomer, advantageously with a degree of functionalization between 0.2 and 4 mass-% is continuously discharged at the end of the reactor.

α,β-ethylenically unsaturated compounds containing carboxyl groups and/or derivatives selected from their anhydrides, mono- or di-esters, or mono- or di-amides are used as preferred functional monomers. Likewise, the functional monomers can advantageously also be selected from hydroxyl-, epoxy-, amino-, imido-, silane- or other α,β-ethylenically unsaturated compounds containing functional groups.

Of the carboxyl- and anhydride monomers usable as functionalizing agents, the so-called carboxylic monomers, maleic anhydride (MSA) and/or acrylic acid (AS) are particularly preferred. They are used alone or as a mixture with a co-monomer from the group of vinyl aromatics, preferably styrene. Other compounds preferably used as functional monomers are $C_1$- to $C_{12}$-alkyl esters of acrylic or methacrylic acid, preferably methyl or ethyl or butyl acrylate or methyl methacrylate, which are used also either alone or as a mixture with a co-monomer from the group of vinyl aromatics, preferably styrene.

According to one embodiment of the aforedescribed process variant, compositions of from 99 to 20 mass-% functional monomer and from 1 to 80 mass-% of co-monomer are employed, preferably 95 to 50 mass-% of maleic anhydride (MSA) and/or acrylic acid (AA) and from 5 to 50 mass-% styrene.

The grafting initiated by radicals is, in order to achieve adequate degrees of functionalization and uniform grafting, advantageously performed by using a radical former or optionally a mixture of at least two different radical formers by using organic peroxides with 1-hour half-life temperatures ($T_{HWZ/1h}$) between 50 and 200° C. or 1-minute half-life temperatures ($T_{HWZ/1h}$) between 85 and 250° C., measured in 0.1 molar monochlorobenzene solution, with a concentration in relation to the entire graft substrate quantity between 0.001 and 5 mass-%, preferably between 0.02 and 2 mass-%.

Selected examples of useful radical initiators are dialkyl peroxy-dicarbonates with a 1-hour half-life temperature ($T_{HWZ/1h}$) between 60 and 70° C., such as dibutyl peroxy-dicarbonate (DBPOC) and dicetyl peroxy-dicarbonate (DCPOC) with a 1-hour half-life temperature ($T_{HWZ/1h}$) of 65° C., diauroyl peroxide (DLPO) with a 1-hour half-life temperature ($T_{HWZ/1h}$) of 80° C., dibenzoyl peroxide (DBPO) with a 1-hour half-life temperature ($T_{HWZ/1h}$) of 91° C., tert-butyl peroxy-2-ethylhexanoate (TBPEH) with a 1-hour half-life temperature ($T_{HWZ/1h}$) of 91° C., tert-butyl peroxy-isobutyrate (TBPIB) with a 1-hour half-life temperature ($T_{HWZ/1h}$) of 98° C., 1,1-di-(tert-butylperoxy) cyclohexane (DTBPC) with a 1-hour half-life temperature ($T_{HWZ/1h}$) of 113° C., tert-butyl perbenzoate (TBPB) with a 1-hour half-life temperature ($T_{HWZ/1h}$) of 122° C., dicumyl peroxide (DCP) with a 1-hour half-life temperature ($T_{HWZ/1h}$) of 132° C., 2,5-dimethyl-2,5-di (tert-butylperoxy) hexane (DHBP) with a 1-hour half-life temperature ($T_{HWZ/1h}$) of 134° C., 2,5-dimethyl-2,5-di (tert-butylperoxy) hexyne-3 (DYBP) with a 1-hour half-life temperature ($T_{HWZ/1h}$) of 141° C., di-tert-butyl peroxide (TBP) with a 1-hour half-life temperature ($T_{HWZ/1h}$) of 141° C., cumene hydroperoxide (CHP) with a 1-hour half-life temperature ($T_{HWZ/1h}$) of 166° C. and tert-butyl-hydroperoxide (TBHP) with a 1-hour half-life temperature ($T_{HWZ/1h}$) of 185° C.

Taking into account the particular use, at least one additive selected from among known antioxidants and/or processing stabilizers, known fillers, reinforcing agents, fire-retardants and lubricant materials, extender oils and other additives can be added prior to further processing to the olefin elastomer functionalized according to the invention in the first stage, in the concentrations customary for the respective additives, as well as at least one polymer and/or elastomer component with a proportion of 1 to 90 mass-% in relation to the entire elastomeric molding material content.

Particularly advantageous is the use of processing stabilizers, wherein generally primary antioxidants are added based on sterically hindered phenol compounds with a proportion of 0.01 to 5 mass parts, preferably 0.1 to 2 mass parts, in relation to a elastomeric olefin copolymer or olefin block copolymer functionalized to 100 mass parts. Frequently, processing stabilizers are also used in the form of a combination of at least one primary and at least one secondary antioxidant, preferably a mixture consisting of 20 to 67 mass-% of a sterically hindered phenol and 80 to 33% mass-% of a phosphite compound.

The types IRGANOX® 1010 (pentaerythrityl tetrakis-[3-(3,5-di-tert-butyl-4-hydroxyphenyl) propionate]), IRGANOX® 1330, IRGANOX® 1425 WL and IRGANOX® 3114 offered commercially by Ciba, as well as synergistic IRGANOX® mixtures of 20 to 50 mass-% of one of these primary antioxidants and 50 to 80 mass-% of the secondary antioxidant IRGAFOS® 168 (tris-(2,4-di-tert-butyl phenyl) phosphite), such as the type IRGANOX®

B561 prepared from 20 mass-% IRGANOX® 1010 and 80 mass-% IRGAFOS® 168, can be used as particularly suitable primary antioxidants.

Preferably, the functionalized thermoplastic elastomers according to the invention with a degree of functionalization between 0.1 and 5 mass-%, preferably with a degree of carboxylation between 0.2 and 4 mass-%, can be used as an adhesion promoter and/or adhesive for various substrates or multi-layer composites, preferably on and between plastic and/or metal surfaces.

Further details, features and advantages of the invention will become apparent from the following description of exemplary embodiments.

In the exemplary embodiments, the abbreviation MT is used for the unit "mass parts". Accordingly, the unit mass parts per hour is abbreviated as MT/h.

Solid Phase Grafting

Example 1

In a temperature-controllable fluid mixing reactor equipped with an continuously variable stirrer from the company Reimelt Henschel, 100 MT powdery ethylene/α-olefin block co-elastomer of the type Infuse D 9007.15 with a density of 0.866 g/cm$^3$, a melt flow rate (MFR) (190° C./2.16 kg) of 0.5 g/10 min, a Shore hardness A of 64 and an average particle diameter of 0.36 mm, hereinafter referred to as OBC 0.5, together with 1 MT dilauroyl peroxide, in the following designated by the abbreviation DLPO, and 2.8 MT maleic anhydride, hereinafter abbreviated as MSA, are fed at an internal reactor temperature of 20° C. Thereafter, the reaction mixture is dispersed in a nitrogen atmosphere at an agitation speed of 650 revolutions per minute [RPM] while simultaneously increasing the temperature with a heating rate of 2° C./min, and upon reaching the final reaction temperature $T_{R1}$ of 90° C. maintained at $T_{R1}$ over a time $t_{R1}$ of 60 min.

The solid phase reaction is terminated by discharging the reaction product into the cooling mixer at a temperature of 20° C., from which it is taken out for determining the characteristic values shown in Table 1.

Examples 2 to 13

In the following examples, the term melt flow rate is abbreviated as MFR and the term melt volume rate is abbreviated with MVR.

Other graft-functionalized olefin copolymers or olefin block copolymers are prepared according to the process flow described in Example 1 by using the following components:
Particulate Elastomeric Graft Substrates:
Infuse D 9007.15: density=0.866 g/cm$^3$, MFR (190° C./2.16 kg)=0.5 g/10 min, Shore A=64, with the designation description OBC-0.5,
Infuse D 9817.15: density=0.877 g/cm$^3$, MFR (190° C./2.16 kg)=15 g/10 min, Shore A=75, with the designation OBC-15,
Versify 4000.01: density=0.888 g/cm$^3$, MFR (230° C./2.16)= 25 g/10 min, Shore A: 96
Notio PN-3560: density=0.866 g/cm$^3$, MFR (230° C./2.16 kg)=6 g/10 min, Shore A: 70
Septon V 9461: density 0.863 g/cm$^3$, MVR (320° C./21.6 kg)=7.2 cm$^3$/10 minutes
Septon V 9461-compound (for 100 MT Septon V 100 MT process oil and 27 MT PP): MFR (230° C./10 kg)=7 g/10 min, Shore A hardness=61.

All of the aforementioned graft substrates with the designation Infuse belong to the group of olefin block copolymers (OBC) having the composition 80 to 98 mass-% ethylene-/2 to 20 mass-% of $C_3$- to $C_{12}$-olefin units. The OBC are generally materials that are characterized by alternating HDPE and POE blocks. All of the aforementioned graft substrates with the designations Versify and Notio belong to the group of semi-crystalline propylene/ethylene- and/or $C_4$- to $C_{12}$-olefin copolymers and/or $C_4$- to $C_{12}$-diene copolymers having the composition 50 to 98 mass-% propylene-/2 to 50 mass-% of $C_2$- and/or $C_4$- to $C_{12}$-olefin units and/or $C_4$- to $C_{12}$-diene units. All of the aforementioned graft substrates with the designation Septon belong to the group of cross-linked styrene/olefin/styrene- or styrene/olefin block copolymers.
Graft Monomers:
Maleic anhydride with the abbreviation MSA and acrylic acid with the abbreviation AS, hydroxyethyl acrylate with the abbreviation HEA, methyl methacrylate with the abbreviation MMA, and butyl acrylate with the abbreviation BA as well as styrene as co-monomer addition to the aforementioned functional monomers;
Peroxide Initiators:
Dilauroyl with the abbreviation DLPO, 2,5-dimethyl-2,5-di (tert-butylperoxy) hexane with the abbreviation DHBP, and dicetyl peroxidicarbonate with the abbreviation DCPOC, wherein these abbreviations are primarily used below.

While maintaining the charging and heating regime used in the Example 1, the reaction end temperature $T_{R1}$, at a reaction time $t_{R1}$ of 50 to 60 min and an agitation speed between 400 and 700 RPM and the monomer/initiator proportions introduced for 100 MT olefin elastomer are varied as essential parameters in accordance with the examples given in Table 1.

Table 1 lists the key process parameters for solid phase grafting:
  Column 1: example number (Ex. No.)
  Column 2: employed olefin-graft substrate, 100 MT
  Column 3: type and concentration of the employed initiator in [MT]
  Column 4: monomer(s) with concentration specified in [MT]
  Column 5: final reaction temperature $T_{R1}$ in [° C.]
  Column 6: volume melt rates, abbreviated as MVR, in [cm$^3$/10 min]
  Column 7: grafted monomer content, expressed as a degree of functionalization FG in mass-%.

TABLE 1

| Ex. No. | Elastomer 100 MT | Initiator [MT] | Monomer [MT] | $T_{R1}$ [° C.] | MVR [cm$^3$/10 min] | FG [wt.-%] |
|---|---|---|---|---|---|---|
| 1 | OBC 0.5 | 1.0 DLPO | 2.8 MSA 1.0 styrene | 92 | 2.2 (190° C./21.6 kg) | 1.31 |
| 2 | OBC-15 | 1.0 DLPO | 4.0 HEA 1.0 styrene | 90 | 18 (190° C./2.16 kg) | 2.51 |

TABLE 1-continued

| Ex. No. | Elastomer 100 MT | Initiator [MT] | Monomer [MT] | $T_{R1}$ [° C.] | MVR [cm³/10 min] | FG [wt.-%] |
|---|---|---|---|---|---|---|
| 3 | OBC-15 | 1.0 DLPO | 6.0 MMA 0.5 BA | 90 | 19 (190° C./2.16 kg) | 3.3 |
| 4 | OBC-15 | 1.0 DLPO | 2.8 MSA 0.5 styrene | 88 | 7.5 (190° C./21.6 kg) | 1.62 |
| 5 | OBC-15 | 1.0 DLPO | 5.0 BA | 90 | 13 (190° C./2.16 kg) | 3.7 |
| 6 | Versify | 0.5 DLPO | 5.0 AS 1.0 styrene | 90 | 18 (230° C./2.16 kg) | 2.75 |
| 7 | Versify | 0.3 DCPOC | 4.5 AS 1.0 MSA 0.5 styrene | 90 | 13 (230° C./2.16 kg) | 3.27 |
| 8 | Notio | 1.0 DLPO | 1.9 MSA 0.2 styrene | 90 | 0.9 (230° C./2.16 kg) | 0.94 |
| 9 | Notio | 0.7 DLPO | 1.5 MSA 0.5 styrene | 90 | 1.0 (230° C./2.16 kg) | 0.77 |
| 10 | Notio | 1.2 DCPOC | 1.5 MSA 0.5 Styrene | 85 | 5.6 (230° C./5 kg) | 0.84 |
| 11 | Septon V | 1.0 DLPO | 2.1 MSA | 100 | 18 (320° C./21 kg) | 1.20 |
| 12 | Septon V | 0.14 DHBP | 2.4 MSA | 160 | 23 (320° C./21 kg) | 1.51 |
| 13 | Septon V-Compound | 0.5 DCPOC | 2.4 MSA | 80 | 16 (320° C./21 kg) | 0.64 |

Melt Grafting and Melt Compounding

As an advantageous embodiment of the inventive solution while using a particular concentration of solid phase functionalized product and after the addition of a further proportion of a functional monomer, an initiator and usually also a stabilizer, unmodified olefin elastomer is graft-functionalized in the molten state—in addition to the direct use of the elastomers functionalized in accordance with the inventive examples 1 to 13.

Preferably, the reactive extrusion, in particular the carboxylation or maleation, is performed in a twin-screw extruder.

Example 14

The powdery solid phase product obtained in the first stage according to Example No. 1, which is included in the total mixture with 81.8 mass-% and to which 16 mass-% MSA and 1.2 mass-% DHBP and as a stabilizer 1.0 mass-% IRGANOX® B561, and mixture of 20 mass-% of the primary antioxidant, IRGANOX® 1010 and 80 mass-% of the secondary antioxidant IRGAFOS® 168 (manufacturer: Ciba) were added and dispersed, is fed via a metering scale at a feed rate of 5 MT/h to a twin screw kneader of the type ZSK 25 (L=42 D, temperatures ranging from 160 to 240° C., screw speed: 300 RPM) from the company Werner & Pfleiderer, equipped with an underwater granulator, abbreviation UWG. Simultaneously, granular OBC D 9000.00 with the characteristic value MVR (230° C./5 kg)=4 cm³/10 min, hereinafter referred to as OBC-4, are metered on a second scale 95 MT/h and added.

In accordance with the above-mentioned mass ratio of the solid phase graft product-mixture and OBC-4, the reactive extrusion is carried out at an average throughput of 100 MT/h. The melt temperature $T_M$ is measured as 256° C. The smooth product strand emerging from the extruder nozzle is cut off by UWG. After drying the granules, the following parameters listed in Example 14 are determined:

MVR (230° C./5 kg)=5.3 cm³/10 min and degree of maleation $CS_{ex}$=0.84 mass-%.

Examples 15 to 20

By varying the recipe for melt grafting and melt compounding, i.e. the type of the components and their proportions, further melt grafting was carried out with the extrusion conditions described in Example 14, i.e. temperature, screw rotation speed and throughput, with the results being shown in Table 2.

In Table 2 are Listed:

Column 1 contains the numbers of the examples. Column 2 contains the concentration of used solid phase graft product with the corresponding example number from Table 1, indicated in mass parts per hour [MT/h]. Column 3 contains the type and concentration of added unmodified olefin elastomer, expressed in [MT/h]. In column 4, the average melt temperature $T_M$ measured on the ZSK-nozzle is listed in [° C.]. In columns 5 to 7, the determined characteristic values are given, with column 5 containing the melt volume rate (MVR) (230° C./5 kg) in [cm³/10 min] and the qualitative strand assessment, selected from the assessments "smooth", "almost smooth" and "rough". Column 6 includes an indication of the respective degree of functionalization ($CS_{ex}$), given in mass-%, also abbreviated as [wt.-%]. Column 7 contains information relating to the adhesive or peel strength (peel strength), specified in [N/mm].

The grafted portion $CS_{ex}$ of MSA or AS, i.e. the degree of functionalization, also referred to as carboxylation or for MSA-grafting as degree of maleation $CS_{ex}$ designated, was determined by way of reverse titration of the potassium hydroxide solution that was not neutralized by the proportion of carboxylic acid, i.e. MSA or AS, as follows: After treatment of the residue contained in the boiling methanol of a 2 g graft product sample over more than 6 h at 80° C. with a mixture composed of 100 ml of water-saturated xylene and 20 ml of 0.1 molar methanolic potassium hydroxide solution, titration is carried out with 0.1 molar hydrochloric acid following the adding of a few drops of a 1% methanolic phenolphthalein solution.

The grafted amount of HEA, BA and MMA—also shown as $CS_{ex}$ values in Table 2—was determined by Near Infrared (NIR) analysis.

The melt volume rates, abbreviation MVR, just like the melt flow rates, abbreviation MFR, were determined according to ISO 1133.

Moreover, Table 2 also indicates a characteristic value for the adhesive strength in the form of the modified peel strength (peel strength) as a key property for the evaluation of the inventively functionalized olefin thermoplastic elastomers.

Table 2 also lists for comparison in the Examples 14A, 17A, 18A and 20A four graft-carboxylated olefin elastomers in the melt that were produced exclusively in the melt—without supplying an olefin elastomer grafted in the solid phase—, wherein in contrast to the examples according to the invention, the MSA, the initiator DHBP and also the stabilizer IRGANOX® B561 are fed not in the form of a mixture with the solid phase graft product, but instead are fed via the scale 2 into the extruder intake premixed in a portion of the respective unmodified olefin elastomer. According to the Example 14A, 95 MT/h of pure OBC D9000.00 was here fed via the first scale and a mixture consisting of 4 MT/h of pure OBC D9000.00, 0.9 MT/h MSA, 0.05 MT/h DHBP and 0.05 MT/h IRGANOX® B561 was fed via the second scale. A corresponding process occurred in the other comparative examples 17A, 18A and 20A.

0.05 mass-% of Irganox® B561 were used in the examples for which no stabilizer concentrations are listed in the Table 2.

As adhesion strength parameter is the peel strength determined in a material testing machine TC-FR010TH.A5V from the company Zwick GmbH & Co. on clamped samples composed of aluminum sheet strip/0.3 mm adhesive film/ aluminum sheet strip composites (Al/HV/Al) with a pulling speed of 100 mm/min.

The granules obtained by UWG are extruded after drying into 0.3 mm thick sheets, cut into strips having a length of 80 mm and a width of 40 mm, and placed between two aluminum sheet strips with the same dimensions. The Al/HV/Al composites are then heat-treated in an oven at 180° C., and are afterwards measured after different storage times in the oven without application of additional weight and pressure.

The measurement is performed after a storage time of 8 min on the respective Al/HV/Al sample stripes that were cut into three pieces of 13.3 min×80 mm each. The peel strengths listed in Table 2 are the average values obtained from four Al/HV/Al composites and hence from a total of 12 single values for the test strips of a tested sample.

As the comparison of the characteristic values of graft products with the pure melt-functionalized products from the Examples 14A, 17A, 18A and 20A of Table 2 shows, the functionalized olefin elastomers produced according to the invention are characterized by high adhesive strengths with peel strengths a 5 N/mm and by concurrent melt viscosities according MVR values (230° C./5 kg) between 1 and 30 cm$^3$/10 min well and are thus well suited for many applications. In addition, it should be particularly emphasized

TABLE 2

| | Extruder operation | | | | Characteristic values | | |
|---|---|---|---|---|---|---|---|
| Ex. No. | Olefin elastomer [MT/h] | Solid phase Prod Table 1 [MT/h] | Monomer/ Initiator [MT/h] | $T_M$ [° C.] | MVR (230/5) [cm$^3$/10'] | $CS_{ex}$ [wt.-%] | Peeling strength [N/mm] |
| 14 | 95 OBC-4 | 4.09 No. 1 | 0.8 MSA 0.05 DHBP | 256 | 5.3 smooth | 0.84 | 6.2 |
| 14A | 99 OBC-4 | — | 0.9 MSA 0.05 DHBP | 258 | 2.3 almost smooth | 0.65 | 4.1 |
| 15 | 92 OBC-15 | 6.544 no. 1 | 1.28 MSA 0.096 DHBP 0.08 stab. | 262 | 14 smooth | 0.92 | 7.0 |
| 16 | 95 OBC-4 | 4.01 No. 4 | 0.8 MSA 0.04 DHBP 0.15 stab | 252 | 4.6 smooth | 0.71 | 6.6 |
| 17 | 95 Versify | 4.09 No. 6 | 0.8 MSA 0.05 DHBP | 235 | 29 smooth | 0.87 | 6.3 |
| 17A | 99 Versify | — | 0.9 MSA 0.05 DHBP | 235 | 12 almost smooth | 0.67 | 4.5 |
| 18 | 95 Notio | 4.1 No. 8 | 0.8 MSA 0.05 DHBP | 238 | 6.7 smooth | 0.73 | 6.0 |
| 18A | 99 Notio | — | 0.9 MSA 0.05 DHBP | 240 | 2.3 rough | 0.65 | 4.1 |
| 19 | 95 OBC-4 | 4.1 No. 2 | 0.8 HEA 0.05 DHBP | 261 | 1.6 smooth | 0.91 | 5.3 |
| 20 | 90 OBC-4 | 8.2 No. 5 | 1.6 BA 0.1 DHBP 0.1 stab | 258 | 1.2 almost smooth | 1.25 | 6.5 |
| 20A | 98 OBC-4 | — | 1.8 BA 0.1 DHBP 0.1 stab. | 260 | 0.5 rough | 0.95 | 4.8 | that the high peel strengths of these new adhesion promoters are retained even after prolonged heat treatment.

LIST OF ABBREVIATIONS USED

AS Acrylic acid
BA Butyl acrylate
CHP Cumene hydroperoxide
$CS_{ex}$ Degree of maleation, carboxylation, grafted proportion
DBPO Dibenzoylperoxide
DBPOC Dibutyl peroxidicarbonate
DCP Dicumylperoxide
DCPOC Dicetyl peroxidicarbonate
DHBP 2,5-dimethyl-2,5-di (tert-butylperoxy) hexane
DLPO Diauroylperoxide
DTBPC 1,1-di-(tert-butylperoxy)-cyclohexane
DYBP 2,5-dimethyl-2,5-di (tert-butylperoxy) hexyne (3)
EOC Ethylene/octene ($C_8$) copolymers
EPM Ethylene/propylene rubber
FG Degree of functionalization
HDPE High density polyethylene
HEA Hydroxyethyl acrylate
HV Adhesion promoter
LDPE Low density polyethylene
LLDPE Linear ethylene copolymers with a low $C_3$- to $C_{12}$-olefin co-monomer fraction below 15 mass-%
MFR Melt flow rates
MMA Methyl methacrylate
MSA Maleic anhydride
MT Mass parts
MT/h Mass parts per hour
MVR Melt volume rate
NIR Near Infrared
OBC Olefin block copolymer
POE Linear ethylene copolymers with a higher $C_3$- to $C_{12}$-olefin co-monomer fraction above 15 mass-%
TBHP tert-butyl hydroperoxide
TBP Di-tert-butyl
TBPB tert-butyl perbenzoate
TBPEH tert-butyl peroxy-2-ethylhexanoate
TBPIB tert-butyl peroxy-isobutyrate
$T_{HWZ/1h}$ 1-hour half-life temperature
$T_{HWZ/1min}$ 1 minute half-life temperature
$T_M$ Melt temperature
TPE-S Styrene/diene segment/styrene or styrene/diene segment—block copolymers
TPES-V Styrene/olefin/styrene—block copolymers
$T_{R1}$ Reaction end temperature
$t_{R1}$ Time (for holding the reaction end temperature $T_{R1}$)
RPM Revolutions per minute
UWG Underwater granulation

The invention claimed is:

1. A process for preparing a functionalized thermoplastic elastomer based on particulate graft substrates selected from the group consisting of:
   (i) olefin block copolymers comprising 80 to 98 mass-% of ethylene- and 2 to 20 mass-% of $C_3$- to $C_{12}$-olefin units;
   (ii) semi-crystalline copolymers of the composition 50 to 98 mass-% of propylene- and 2 to 50 mass-% of ethylene and/or $C_4$- to $C_{12}$-olefin and/or $C_4$- to $C_{12}$-diene units, and
   (iii) cross-linked styrene/olefin/styrene block copolymers or cross-linked styrene/olefin block copolymers,
   wherein in a fluid mixing reactor, is added:
     0.1 to 15 mass parts of α,β-ethylenically unsaturated compounds containing at least one functional monomer or a monomer mixture containing the at least one functional monomer, wherein the at least one functional monomer contains functional groups,
     0.01 to 10 mass parts of at least one initiator forming free radicals with a 1-hour half-life temperature ($T_{HWZ/1h}$) between 50 and 200°, and
     100 mass parts of the particulate graft substrate;
   wherein the unsaturated compounds, the at least one initiator and particulate graft substrate are polymerized at reaction temperatures between 40° C. and the melting or softening temperature of the particulate graft substrate for a reaction time between 10 and 200 min in a solid-fluid phase, wherein a graft product having a grafted functional monomer is produced by such a solid state functionalization, which is used as a starting component for further processing, wherein during further processing:
   100 mass parts of the graft product is mixed with: (i) between 0.1 and 60 mass parts of at least one other functional monomer; or (ii) between 0.1 and 60 mass parts of another monomer mixture containing the at least one other functional monomer and between 0.01 and 20 mass parts of at least one other initiator forming free radicals with a 1-hour half-life temperature ($T_{HWZ/1h}$) 80-240° C. producing a mixture; the mixture together with 100 to 4000 mass parts of an unmodified olefin elastomer, are continuously fed into an intake area of a reaction extruder via metering devices,
   reactive extrusion from the reactor extruder is carried out at temperatures above melting or softening point of the unmodified olefin elastomer, and
   the functionalized thermoplastic elastomer is continuously discharged from the reaction extruder.

2. The process according to claim 1, wherein the at least one functional monomer is α,β-ethylenically unsaturated compounds containing carboxyl groups and/or derivatives selected from their anhydrides and/or mono- or diesters and/or mono- or diamides.

3. The process according to claim 1, wherein the functional groups comprise hydroxyl, epoxy-, amino-, imido- or silane groups.

4. The process according to claim 2, wherein the functional monomers are maleic anhydride (MA) and/or acrylic acid (AS) alone or as a mixture with a co-monomer from a group of vinyl aromatics.

5. The process according to claim 2, wherein the functional monomers are $C_1$- to $C_{12}$-alkyl esters of acrylic or methacrylic acid alone or as a mixture with a co-monomer from a group of vinyl aromatics.

6. The process according to claim 4, wherein compositions of 99 to 20 mass-% of the functional monomer and 1 to 80 mass-% of the co-monomer are used.

7. The process according to claim 1, wherein the radical-initiated grafting using a radical former or a mixture consisting of at least two different free-radical formers is performed using organic peroxides with 1-hour half-life temperature ($T_{HWZ/1h}$) between 50 and 200° C. or a 1-minute half-life temperature ($T_{HWZ/1min}$) between 85 and 250° C. in a concentration between 0.001 and 5 mass-% in relation to an entire quantity of the graft substrate.

8. The process according to claim 7, wherein dialkyl peroxydicarbonates with a 1-hour half-life temperature ($T_{HWZ/1h}$) between 60 and 70° C., dilauroylperoxide (DLPO) with a 1-hour half-life temperature ($T_{HWZ/1h}$) of 80° C., dibenzoyl peroxide (DBPO) with a 1-hour half-life temperature ($T_{HWZ/1h}$) of 91° C., tert-butyl peroxy-2-ethylhexanoate (TBPEH) with a 1-hour half-life temperature ($T_{HWZ/1h}$) of 91° C., tert-butyl peroxy-isobutyrate (TBPIB) with a 1-hour half-life temperature ($T_{HWZ/1h}$) of 98° C., 1,1-di-(tert-butylperoxy) cyclohexane (DTBPC) with a 1-hour half-life temperature ($T_{HWZ/1h}$) of 113° C., tert-butyl perbenzoate (TBPB) with a 1-hour half-life temperature ($T_{HWZ/1h}$) of 122° C., dicumyl peroxide (DCP) having a 1-hour half-life temperature ($T_{HWZ/1h}$) of 132° C., 2,5-dimethyl-2,5-di (tert-butylperoxy) hexane (DHBP) with a 1-hour half-life temperature ($T_{HWZ/1h}$) of 134° C., 2,5-dimethyl-2,5-di (tert-butylperoxy) hexyne-3 (DYBP) with a 1-hour half-life temperature ($T_{HWZ/1h}$) of 141° C., di-tert-butyl peroxide (TBP) having a one-hour half-life temperature ($T_{HWZ/1h}$) of 141° C., cumene hydroperoxide (CHP) with a 1-hour half-life temperature ($T_{HWZ/1h}$) of 166° C. and tert-butyl hydroperoxide (TBHP) with a 1-hour half-life temperature ($T_{HWZ/1h}$) of 185° C. are used as the radical formers.

9. The process according to claim 1, further comprising the step of adding to the functionalized thermoplastic elastomer at least one additive selected from antioxidants and/or processing stabilizers, fillers, reinforcement agents, flame retardants, lubricants, extender oils, and at least one polymer and/or elastomer component with a proportion of 1 to 90 mass-% based on the entire elastomeric extruded mass.

10. The process according to claim 9, further comprising the step of adding as processing stabilizers primary antioxidants which are sterically hindered phenol compounds with a proportion of 0.01 to 5 mass parts in relation to an elastomeric olefin copolymer or olefin block copolymer functionalized to 100 mass parts.

11. The process according to claim 10, wherein the processing stabilizers are a combination of at least one primary and at least one secondary antioxidant.

12. The method according to claim 1, wherein the fluid mixing reactor is a temperature-controllable mixer for fine-grained materials.

13. A process for preparing a functionalized thermoplastic elastomer based on particulate graft substrates selected from the group consisting of:
(i) olefin block copolymers comprising 80 to 98 mass-% of ethylene- and 2 to 20 mass-% of $C_3$- to $C_{12}$-olefin units;
(ii) semi-crystalline copolymers of the composition 50 to 98 mass-% of propylene- and 2 to 50 mass-% of ethylene and/or $C_4$- to $C_{12}$-olefin and/or $C_4$- to $C_{12}$-diene units, and
(iii) cross-linked styrene/olefin/styrene block copolymers or cross-linked styrene/olefin block copolymers,
wherein in a fluid mixing reactor is added:
0.1 to 15 mass parts of α,β-ethylenically unsaturated compounds containing at least one functional monomer or a monomer mixture containing the at least one functional monomer, wherein the at least one functional monomer contains functional groups,
0.01 to 10 mass parts of at least one initiator forming free radicals with a 1-hour half-life temperature ($T_{HWZ/1h}$) between 50 and 200° C. are added to, and
100 mass parts of the particulate graft substrate;
wherein the unsaturated compounds, the at least one initiator and the particulate graft substrate are polymerized at reaction temperatures between 40° C. and the melting or softening temperature of the particulate graft substrate for a reaction time between 10 and 200 min in a solid-fluid phase, wherein a graft product having a grafted functional monomer is produced by such a solid state functionalization, which is used as a starting component for further processing, wherein during further processing:
100 mass parts of the graft product is mixed with: (i) between 0.5 to 50 mass parts of at least one other functional monomer; or (ii) between 0.5 to 50 mass parts of another monomer mixture containing the at least one other functional monomer and between 0.02 and 12 mass parts containing at least one initiator forming free radicals with a 1-hour half-life temperature ($T_{HWZ/1h}$) 80-240° C. producing a mixture; the mixture together with 200 to 2000 mass parts of an unmodified olefin elastomer, are continuously fed into an intake area of a reaction extruder via metering devices,
reactive extrusion from the reactor extruder is carried out at reaction temperatures between 160 and 300° C.,
the functionalized thermoplastic elastomer is continuously discharged from the reaction extruder.

\* \* \* \* \*